(12) United States Patent
Ward et al.

(10) Patent No.: US 7,561,588 B2
(45) Date of Patent: Jul. 14, 2009

(54) PROCESSING TWO-OCTET AND FOUR-OCTET VALUES USING BORDER GATEWAY PROTOCOL

(75) Inventors: David Ward, Somerset, WI (US); Russell White, Holly Springs, NC (US)

(73) Assignee: Cisco Technology, Inc., San Jose, CA (US)

( * ) Notice: Subject to any disclaimer, the term of this patent is extended or adjusted under 35 U.S.C. 154(b) by 607 days.

(21) Appl. No.: 11/188,219

(22) Filed: Jul. 22, 2005

(65) Prior Publication Data

US 2007/0019673 A1 Jan. 25, 2007

(51) Int. Cl.
*H04L 12/28* (2006.01)
(52) U.S. Cl. ...................................... 370/401
(58) Field of Classification Search ................ None
See application file for complete search history.

(56) References Cited

U.S. PATENT DOCUMENTS 6,553,423 B1 * 4/2003 Chen .......................... 709/230

OTHER PUBLICATIONS

Chen, Enke, et al., "Dynamic Capability for BGP-4," Network Working Group, Internet Draft, draft-ietf-idr-dynamic-cap-07.txt., 8 pages.
Bekhter, Y., et al., "A Border Gateway Protocol 4 (BGP-4)," Network Working Group, Mar. 1995, 57 pages.
Sangli, Srihari R., et al., "BGP Extended Communities Attribute," Network Working Group, Internet Draft, draft-ietf-idr-bgp-ext-communitites-09.txt, 12 pages.
Vohra, Quaizar, et al., "BGP Support for Four-octet AS Number Space," Network Working Group, Internet Draft, draft-ietf-idr-as4bytes-10.txt, 9 pages.
Chen, Enke, et al., "Dynamic Capability for BGP-4," Network Working Group, Internet Draft, draft-ietf-idr-dynamic-cap-07.txt., 8 pages, Dec. 2005.
Bekhter, Y., et al., "A Border Gateway Protocol 4 (BGP-4)," Network Working Group, Mar. 1995, 57 pages.
Sangli, Srihari R., et al., "BGP Extended Communities Attribute," Network Working Group, Internet Draft, draft-ietf-idr-bgp-ext-communitites-09.txt, 12 pages, Jan. 2006.
Vohra, Quaizar, et al., "BGP Support for Four-octet AS Number Space," Network Working Group, Internet Draft, draft-ietf-idr-as4bytes-10.txt, 9 pages, Jan. 2006.

* cited by examiner

*Primary Examiner*—Frank Duong
(74) *Attorney, Agent, or Firm*—Hickman Palermo Truong & Becker LLP (57) ABSTRACT

A method of processing both two-octet and four-octet autonomous system (AS) identifier values in a first network node that communicates with peer network nodes using Border Gateway Protocol (BGP), comprises receiving a first route message from a BGP peer node that is outside a local autonomous system that includes the first network node, wherein the BGP peer node can process only two-octet AS identifier values; identifying one or more extended community attributes in a route in the received route update message; for each of the identified extended community attributes, modifying the received route by creating an AS set containing four-octet AS identifier values carried in the identified extended community attributes, and attaching the AS set to the received route; and sending the modified received route to a third BGP node.

26 Claims, 4 Drawing Sheets

PROCESSING TWO-OCTET AND FOUR-OCTET VALUES USING BORDER GATEWAY PROTOCOL

FIELD OF THE INVENTION

The present invention generally relates to messages and values used in Border Gateway Protocol as used in internetworks. The invention relates more specifically to techniques for processing both two-octet and four-octet values using Border Gateway Protocol.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In computer systems that use 32-bit bytes or words for instructions, data, or data transfers, the term "octet" refers to eight-bit portions of the bytes or words. Border Gateway Protocol version 4 (BGP4 or BGP), defined in Internet Engineering Task Force (IETF) Request for Comments (RFC) 1771, is the inter-domain routing protocol used to interconnect autonomous systems in both the public Internet and virtually all private internetworks. Currently, BGP messages uniquely identify an autonomous system (AS) using numeric values that are two octets in length. This limits the range of available AS numbers to between 1 and $2^{16}$, or 65,536. As a result, the public Internet is quickly running out of AS numbers to assign to newly connecting networks.

In response, several members of the IETF have proposed modifying BGP for use with a 4-octet or byte-length AS number. Converting router BGP software to use 4-octet AS numbers is attractive because the number of unique autonomous systems that can be represented in BGP messages increases to $2^{32}$.

Pertinent literature in the field includes: Chen, E. and Q. Vohra, "BGP support for four-octet AS number space", RFC draft-ietf-idr-as4bytes-10.txt, July 2004 (referred to herein as "[BGP-4BYTES]"); Chen, E. and S. Sangli, "Dynamic Capability for BGP-4", RFC draft-ietf-idr-dynamic-cap-07.txt, July 2004 [BGP-CAPABILITY]; Sangli, S., Tappan, D., and Y. Rekhter, "BGP Extended Communities Attribute", RFC draft-ietf-idr-bgp-ext-communities-09.txt, July 2005 [BGP-EXTCOMM].

However, no proposal provides an acceptable approach to transition from the existing 2-octet AS number space to a new 4-octet AS number space. In one proposed approach, 4-octet AS numbers are used in routers within a particular AS, but only 2-octet numbers are used in communications with other nodes until all routers in the public Internet are upgraded to support 4-octet AS numbers. This appears to be an untenable solution, because the Internet probably will run out of available unique 2-octet AS numbers long before all routers in the Internet can be upgraded.

Based on the foregoing, there is a clear need for an improved approach for transitioning from 4-octet AS numbers to 2-octet AS numbers.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus for processing two-octet and four-octet values using Border Gateway Protocol is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
    2.0 Structural and Functional Overview
    3.0 Operational Example
    4.0 Implementation Mechanisms—Hardware Overview
    5.0 Benefits, Extensions and Alternatives

1.0 General Overview

The needs identified in the foregoing Background, and other needs and objects that will become apparent for the following description, are achieved in the present invention, which comprises, in one aspect, a method for processing both two-octet and four-octet autonomous system (AS) identifier values in a first network node that communicates with peer network nodes using Border Gateway Protocol (BGP), comprising the computer-implemented steps of receiving a first route message from a BGP peer node that is outside a local autonomous system that includes the first network node, wherein the BGP peer node can process only two-octet AS identifier values; identifying one or more extended community attributes in a route in the received route update message; for each of the identified extended community attributes, modifying the received route by creating an AS set containing four-octet AS identifier values carried in the identified extended community attributes, and attaching the AS set to the received route; sending the modified received route to a third BGP node.

In one feature, the AS set is attached to an AS path attribute of the received route.

In another feature, the extended community attributes are BGP transitive extended community attributes.

According to another feature, the method further comprises determining that a route needs to be advertised to the BGP peer node that can process only two-octet AS identifier values; creating a second route message, wherein each four-octet AS path value of an AS path is stored in a second extended community attribute that is attached to the second route message; formatting an AS path attribute of the second route message to contain two-octet AS path values; inserting one or more two-octet AS values into the AS path attribute, wherein each of the inserted two-octet AS path values identifies the first node, wherein a number of inserted two-octet AS path values is equal to a number of the four-octet AS path values that were stored in the extended community attribute; sending the second route message to the BGP peer node.

In yet another feature, the second extended community attribute is a transitive extended community attribute. In a further feature, the first node advertises a capability of processing four-octet AS path values to the BGP peer node. In still another feature, the received route is discarded upon detecting a loop.

In other aspects, the invention encompasses a computer apparatus and a computer-readable medium configured to carry out the foregoing steps.

2.0 Structural and Functional Overview

According to one embodiment, a technique is provided for switching from 2 octet to 4 octet AS numbers without disturbing the operation of a currently running internetwork that is using BGP for routing. The techniques herein are backward compatible with existing implementations of BGP.

In one embodiment, the BGP protocol definition as provided in IETF RFC 1771 is supplemented with additions to support a transition from 2-octet to 4-octet AS identifier values. In particular, an additional extended community attribute (denoted AS_4OCTET herein to provide a convenient label, which is not required in an embodiment), and a new capability code (denoted 4OCTET_SUPPORT herein, also for convenience and not as a limitation) are provided for routers to support 2-octet and 4-octet transition processing.

Figure 1:
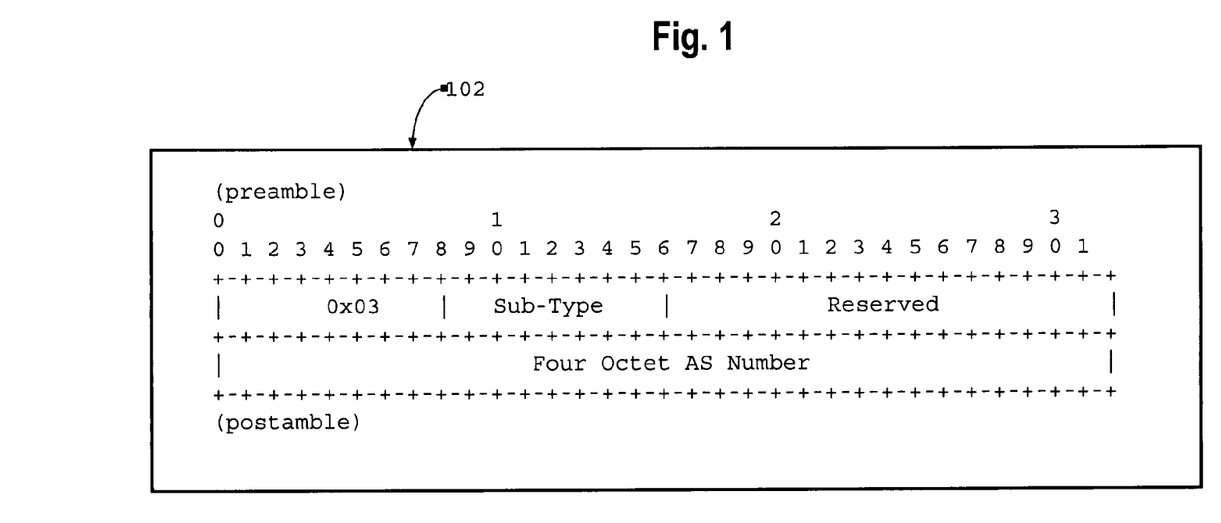
FIG. 1 is a block diagram that illustrates an extended community data structure for supporting 4-octet AS numbers in BGP.

FIG. 1 is a block diagram that illustrates an extended community data structure for supporting 4-octet AS numbers in BGP. According to an embodiment, an AS_4OCTET Extended Community attribute is encoded as described in [BGP-EXTCOMM], using the format of FIG. 1. An AS_4OCTET extended community attribute 102 comprises a type field, a sub-type field, a reserved field, and a 4-octet AS number field. The type field carries the value "0x03," which indicates that the attribute 102 is an opaque extended community attribute that is transitive in nature and an IANA-assignable type using the "First Come First Serve" policy. (IANA, as known in the field, is the Internet authority for assigning numbers.)

The Sub-Type field indicates that this community carries a 4 Octet AS Number to be inserted in the AS_PATH. To ensure cross-compatibility among different systems, the specific value of the Sub-Type field may be assigned by IANA. The Reserved field is reserved for future use and does not have a specific use defined herein, and may be set to 0. The 4-octet AS number field carries a 4-octet autonomous system identifier value. Although the term "number" is used herein to refer to identifier values for autonomous systems, the term "number" broadly refers to any symbol scheme for identifying values. Numbers, alphabetic characters, and alphanumeric character sequences may be used.

In one embodiment, BGP nodes that support 4-octet AS numbers as defined herein also support a 4OCTET_TRANSITION capability. In one approach, a BGP speaker supporting both 4 octet AS Numbers and the transition mechanism herein supports BGP dynamic communities as defined in [BGP-COMMUNITIES]. In an embodiment, such a BGP speaker also advertises a capability as defined herein, denoted 4OCTET_TRANSITION for convenience. The specific value of the 4OCTET_TRANSITION capability may be assigned by IANA, and a supporting BGP speaker will use the specific value.

Figure 2:
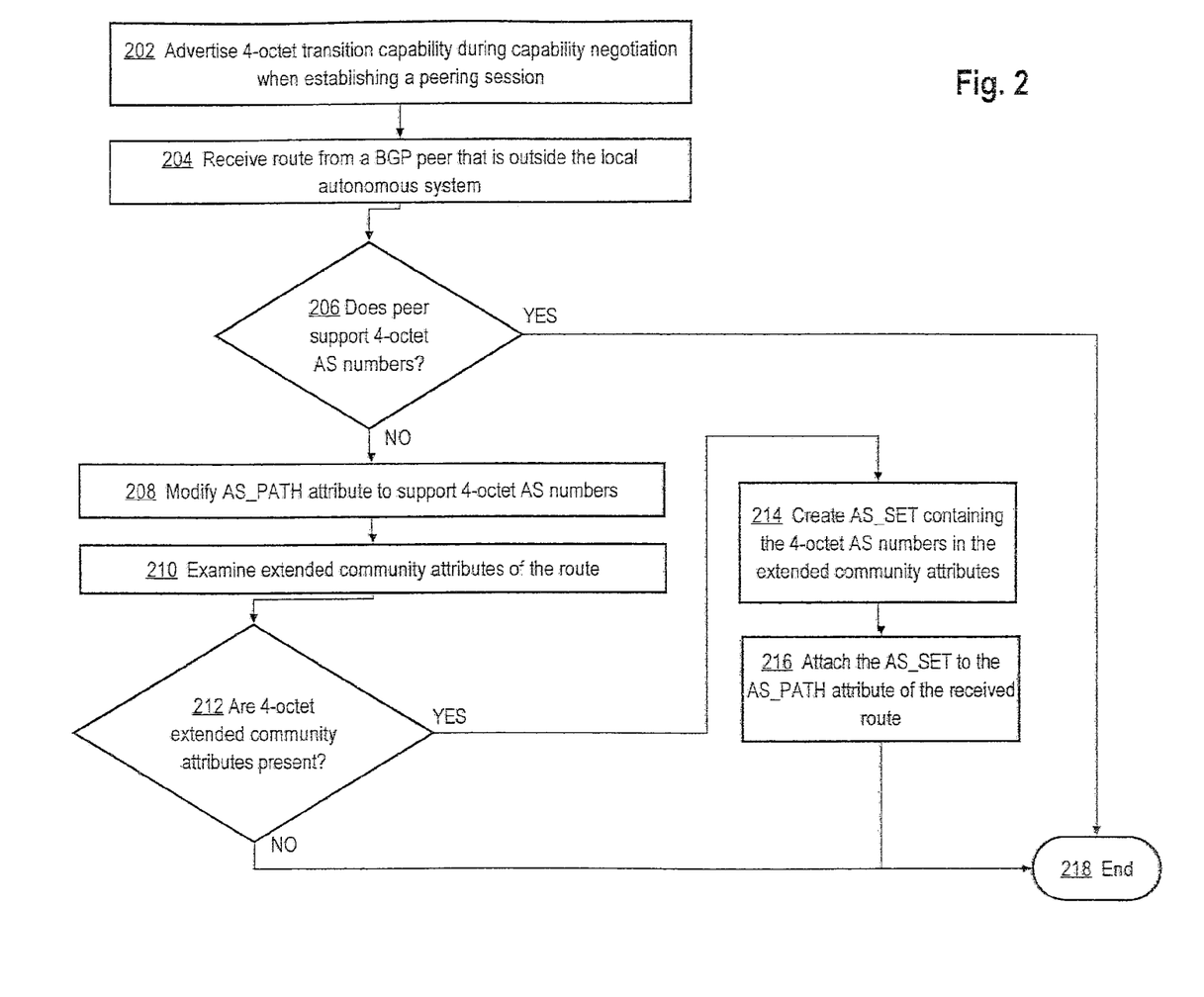
FIG. 2 is a flow diagram that illustrates a high level overview of one embodiment of a method for processing 2-octet and 4-octet AS numbers in BGP when routes are received.
Figure 3:
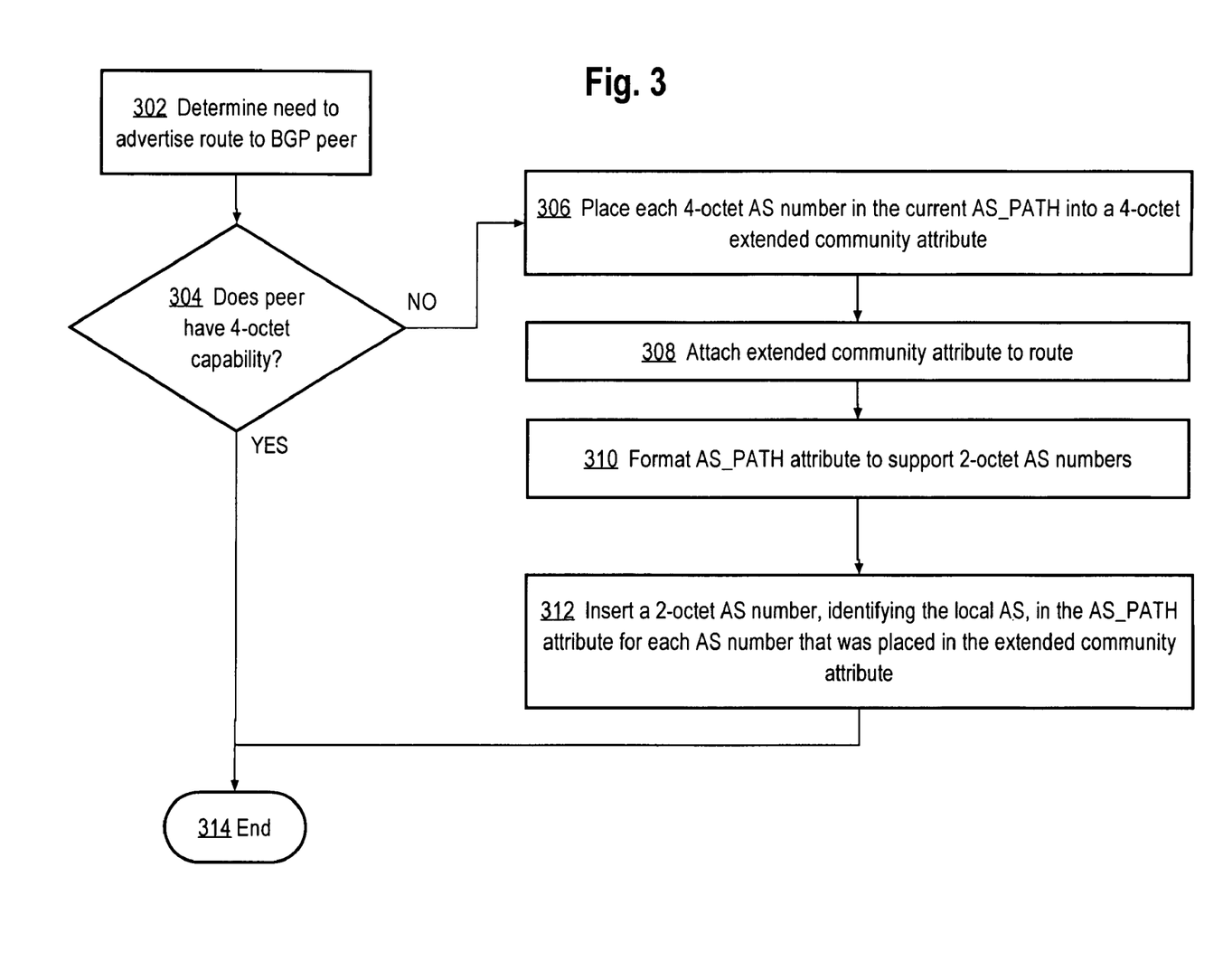
FIG. 3 is a flow diagram that illustrates a high level overview of one embodiment of a method for processing 2-octet and 4-octet AS numbers in BGP when routes are advertised.
Figure 4:
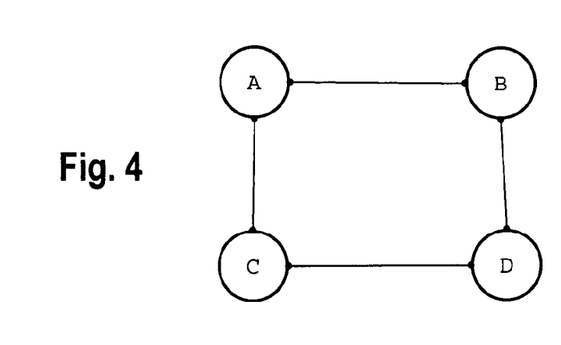
FIG. 4 is a block diagram of a hypothetical network comprising 2-octet BGP nodes and 4-octet BGP nodes.

The following sections describe processing steps that may be used by BGP nodes that support the 2-octet to 4-octet AS number transition approach provided herein, and provide an example of the operation of this mechanism. The processing steps and example are described with reference to FIG. 2, FIG. 3, and FIG. 4. FIG. 2 is a flow diagram that illustrates a high level overview of one embodiment of a method for processing 2-octet and 4-octet AS numbers in BGP when routes are received; FIG. 3 is a flow diagram that illustrates a high level overview of one embodiment of a method for processing 2-octet and 4-octet AS numbers in BGP when routes are advertised; and FIG. 4 is a block diagram of a hypothetical network comprising 2-octet BGP nodes and 4-octet BGP nodes.

Referring first to FIG. 2, at step 202, a BGP node advertises the 4-octet transition capability during the capability negotiation phase of establishing a BGP peering session with another node. Advertising the capability described herein is not mandatory. In an embodiment, a BGP implementation supporting the mechanism herein for transitioning from 2-octet to 4-octet AS numbers should advertise the 4OCTET_TRANSITION capability if it supports this transition mechanism. Capability negotiation may proceed according to the techniques described in RFC 3392.

At step 204, a route is received from a BGP peer that is outside the local autonomous system. Thus, FIG. 2 represents steps that a router or other BGP node performs when interacting with BGP peers in other autonomous systems. The route received at step 204 is typically received in a BGP UPDATE message. The receiving node that performs the processing of FIG. 2 supports the use of 4-octet AS numbers and also supports the transition capability defined herein.

At step 206, the receiving BGP node determines whether the peer node supports 4-octet AS numbers. A receiving node can resolve the test of step 206 by referring to stored capability information that the receiving node acquired during capability negotiation in step 202.

If a route is received from a BGP peer that does not support 4-octet AS numbers, then in step 208 the receiving node modifies the AS_PATH attribute of the received route to support 4 octet autonomous systems, as described in the [BGP-4BYTES] document. Further, the receiving node examines the extended community attributes of the route at step 210, to determine if some other node stored 4-octet AS values in an extended community attribute, thereby preserving the 4-octet values for consumption by nodes that do support 4-octet values.

At step 212 the receiving node tests whether any 4-octet extended community attributes are present. In an embodiment, if there are any AS-4OCTET extended communities attached to the route, then the receiving node creates an AS_SET containing the 4-octet AS numbers that are included, at step 214, and attaches the AS_SET to the AS_PATH attribute of the received route, at step 216. The AS_PATH attribute now contains the 4-octet AS numbers that were carried with the route, even though the route was received from a node that does not directly support 4-octet values.

Control then transfers to step 218, at which processing the received route is complete for purposes of transitioning from 2-octet values to 4-octet values. Thus, after step 218 the receiving BGP peer performs any other appropriate BGP message processing.

If the route has been received from a peer that does support 4-octet values, then the special processing of FIG. 2 is not required, and control transfers to step 218.

Referring now to FIG. 3, a method is provided for processing 2-octet and 4-octet AS numbers in BGP when routes are advertised. At step 302, a BGP node determines that the node needs to advertise a route to a BGP peer. At step 304, the node tests whether the peer has 4-octet AS number capability. For each route advertised to a BGP peer outside the local AS that does not support 4-octet AS numbers or the transition mechanism herein, steps 306-312 are performed.

At step 306, an advertising node examines the current AS_PATH attribute of a route about to be advertised, and the advertising node places each 4-octet AS number of the AS_PATH into an AS_4OCTET extended community. At step 308, the extended community attribute is attached to the route.

At step 310, the AS_PATH attribute is formatted to support 2-octet AS numbers, as described in RFC 1771.

At step 312, for each AS number that was placed in an extended community, a 2-octet AS number identifying the local AS is inserted into the AS_PATH. The effect of step 312 is to pad the AS_PATH attribute so that the AS_PATH attribute has the same length as in the route before steps 306-312 were performed. As a result, the result of a best path calculation performed at a receiving node that does not support 4-octet AS numbers will be the same as if the receiving node had operated on 4-octet AS numbers.

3.0 Operational Example

The processes generally described above for FIG. 2, FIG. 3 are now illustrated in more detail by describing an operational example, with reference to FIG. 4. FIG. 4 is a block diagram of a hypothetical network comprising 2-octet BGP nodes and 4-octet BGP nodes. FIG. 4 depicts four routers A, B, C, D that are coupled by BGP links in a packet-switched internetwork. Each of routers A, B, C, D is in a different AS. Routers A and B are using 4-octet AS numbers, while routers C and D are only capable of using 2 octet AS numbers.

According to an embodiment, routers A and B negotiate their support for 4 octet AS numbers using BGP capabilities negotiation. Router B knows, through capabilities negotiation, that routers C and D do not support 4-octet AS numbers.

When router A originates a route, router A places a 4-octet AS number in the AS_PATH, and sends the route to B. When B transmits the route to D, router B places the 4-octet AS number in a transitive extended community, AS_4OCTET, and prepends the AS_PATH with enough 2-octet AS numbers (identifying B) to make the AS Path length the same as the total 4-octet AS_PATH. When B advertises this route to D, then, it advertises {B,B} (AS_4OCTET: A) (AS_4OCTET: B).

When D advertises this route to C, D adds an identifier of the local AS to the AS_PATH, making the route {B,B,D} (AS_4OCTET: A) (AS_4OCTET: B).

When C advertises this route to A, A will know the route has been transmitted by a router supporting only 2-octet AS numbers, and will look for the transitive extended community providing 4-octet AS information. When A finds the transitive extended community attribute, A inserts the 4-octet AS numbers into the AS_PATH as an AS_SET, thus making the AS_PATH {{A,B},B,B,D,C} Since this is a loop, A will drop the route advertisement.

Assume now that C originates a route towards A. When A receives this route, A will insert a 4 octet AS_PATH, and pad the AS number of C to 4 octets. The approach herein assumes that all AS numbers with two octets of 0 values are always 2-octet AS numbers that have been padded using the technique herein. When A advertises the route to B, A will have an AS_PATH {C,A}.

When B advertises this route to D, B will determine that D does not support 4-octet AS numbers. B examines the AS_PATH, and removes all the AS numbers that are padded 2 octet AS numbers, placing them in an AS_SET. B also removes all of the 4-octet AS numbers, and places the 4-octet AS numbers in a transitive extended community, and again prepends the AS_PATH so that the length remains the same.

To D, B advertises {{C},B,B} (AS_4OCTET: A) (AS_4OCTET: B). When D advertises this route to C, D adds its own 2-octet AS number {{C},B,B,D} (AS_4OCTET: A) (AS_4OCTET: B). C recognizes the route as a loop, and drops the route.

4.0 Implementation Mechanisms—Hardware Overview

Figure 5:
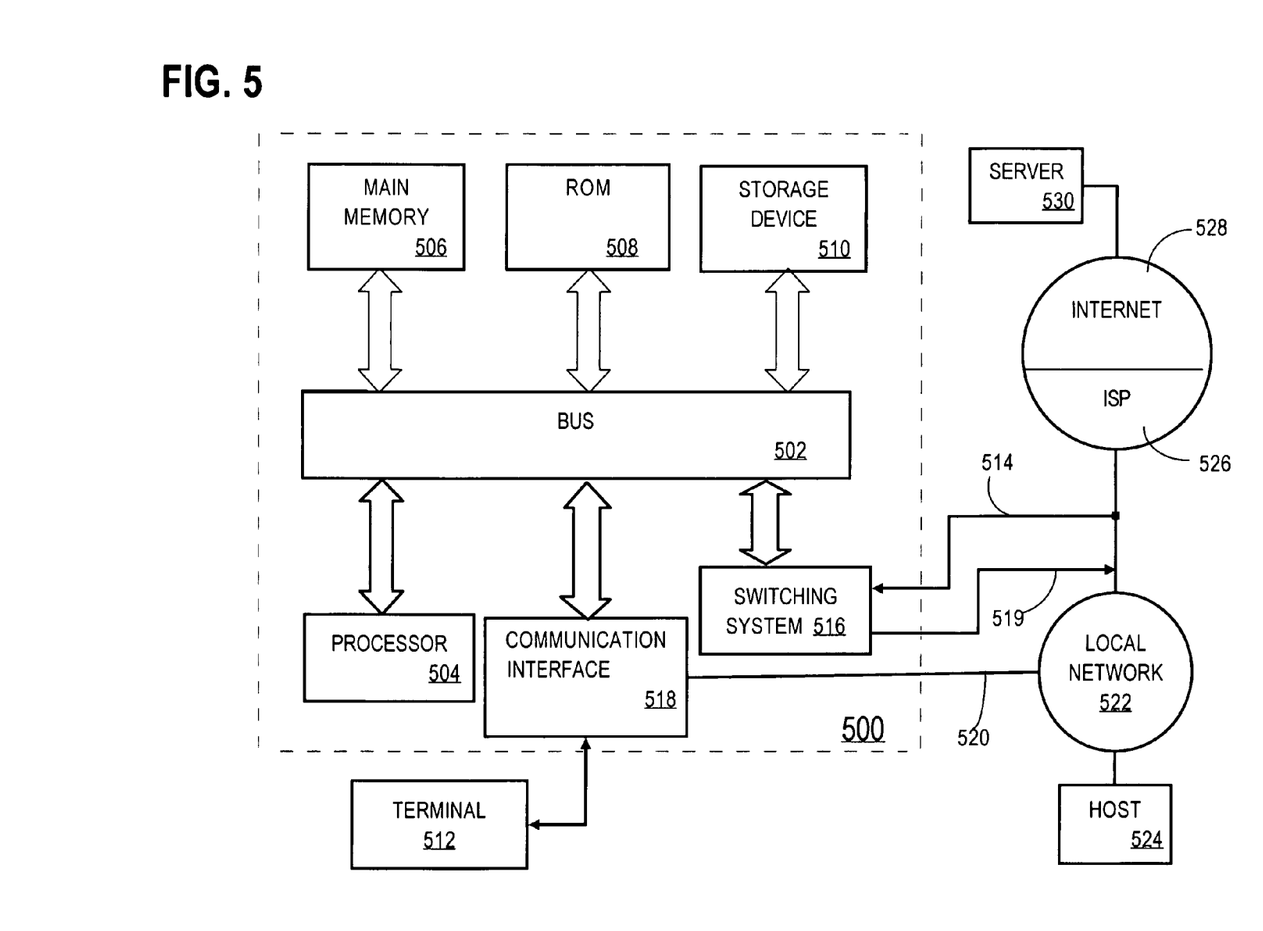
FIG. 5 is a block diagram that illustrates a computer system upon which an embodiment may be implemented.

FIG. 5 is a block diagram that illustrates a computer system 500 upon which an embodiment of the invention may be implemented. The preferred embodiment is implemented using one or more computer programs running on a network element such as a router device. Thus, in this embodiment, the computer system 500 is a router.

Computer system 500 includes a bus 502 or other communication mechanism for communicating information, and a processor 504 coupled with bus 502 for processing information. Computer system 500 also includes a main memory 506, such as a random access memory (RAM), flash memory, or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk, flash memory or optical disk, is provided and coupled to bus 502 for storing information and instructions.

A communication interface 518 may be coupled to bus 502 for communicating information and command selections to processor 504. Interface 518 is a conventional serial interface such as an RS-232 or RS-422 interface. An external terminal 512 or other computer system connects to the computer system 500 and provides commands to it using the interface 514. Firmware or software running in the computer system 500 provides a terminal interface or character-based command interface so that external commands can be given to the computer system.

A switching system 516 is coupled to bus 502 and has an input interface 514 and an output interface 519 to one or more external network elements. The external network elements may include a local network 522 coupled to one or more hosts 524, or a global network such as Internet 528 having one or more servers 530. The switching system 516 switches information traffic arriving on input interface 514 to output interface 519 according to pre-determined protocols and conventions that are well known. For example, switching system 516, in cooperation with processor 504, can determine a destination of a packet of data arriving on input interface 514 and send it to the correct destination using output interface 519. The destinations may include host 524, server 530, other end stations, or other routing and switching devices in local network 522 or Internet 528.

The invention is related to the use of computer system 500 for processing both two-octet and four-octet values using Border Gateway Protocol. According to one embodiment of the invention, processing both two-octet and four-octet values using Border Gateway Protocol is provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. One or more processors in a multi-processing arrangement may also be employed to execute the sequences of instructions contained in main memory 506. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector coupled to bus 502 can receive the data carried in the infrared signal and place the data on bus 502. Bus 502 carries the data to main memory 506, from which processor 504 retrieves and executes the instructions. The instructions received by main memory 506 may optionally be stored on storage device 510 either before or after execution by processor 504.

Communication interface 518 also provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for processing both two-octet and four-octet values using Border Gateway Protocol as described herein.

The received code may be executed by processor 504 as it is received, and/or stored in storage device 510, or other non-volatile storage for later execution. In this manner, computer system 500 may obtain application code in the form of a carrier wave.

5.0 Benefits, Extensions and Alternatives

The approach described herein uses BGP capabilities negotiation and extended communities, and codes the AS Path and AS SETs to preserve all AS Path information. In particular, 4-octet AS number information is coded in transitive extended communities, and AS Path attributes are prepended with pad values to fully code the AS Path information. As a result, loop-free routing is provided for routers in an internetwork, and transitioning from 2-octet to 4-octet AS numbers in a large scale internetwork is supported. The approach herein allows autonomous systems with both 2-octet and 4-octet AS numbers to interoperate.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of processing both two-octet and four-octet autonomous system (AS) identifier values in a first network node that communicates with peer network nodes using Border Gateway Protocol (BGP), the method comprising the computer-implemented steps of:
receiving a first route message from a BGP peer node that is outside a local autonomous system that includes the first network node, wherein the BGP peer node processes only two-octet AS identifier values;
identifying one or more extended community attributes in a first route in the first route message;
for each of the identified extended community attributes, modifying the first route by creating an AS set containing four-octet AS identifier values carried in the identified extended community attributes, and attaching the AS set to the first route;
sending the modified first route to a third BGP node.

2. A method as recited in claim 1, wherein the AS set is attached to an AS path attribute of the first route.

3. A method as recited in claim 1, wherein the extended community attributes are BGP transitive extended community attributes.

4. A method as recited in claim 1, further comprising:
   determining that a second route needs to be advertised to the BGP peer node that processes only two-octet AS identifier values;
   creating a second route message, wherein each four-octet AS path value of an AS path is stored in a second extended community attribute that is attached to the second route message;
   formatting an AS path attribute of the second route message to contain two-octet AS path values;
   inserting one or more two-octet AS values into the AS path attribute, wherein each of the inserted two-octet AS path values identifies the first node, wherein a number of inserted two-octet AS path values is equal to a number of the four-octet AS path values that were stored in the extended community attribute;
   sending the second route message to the BGP peer node.

5. A method as recited in claim 4, wherein the second extended community attribute is a transitive extended community attribute.

6. A method as recited in claim 1, wherein the first node advertises a capability of processing four-octet AS path values to the BGP peer node.

7. A method as recited in claim 1, further comprising discarding the first route upon detecting a loop.

8. A packet routing apparatus for processing both two-octet and four-octet autonomous system (AS) identifier values in a first network node that communicates with peer network nodes using Border Gateway Protocol (BGP), comprising:
   means for receiving a first route message from a BGP peer node that is outside a local autonomous system that includes the first network node, wherein the BGP peer node processes only two-octet AS identifier values;
   means for identifying one or more extended community attributes in a first route in the first route message;
   means for modifying the first route by creating an AS set containing four-octet AS identifier values carried in each of the identified extended community attributes, and attaching the AS set to the first route;
   means for sending the modified first route to a third BGP node.

9. An apparatus as recited in claim 8, wherein the AS set is attached to an AS path attribute of the first route.

10. An apparatus as recited in claim 8, wherein the extended community attributes are BGP transitive extended community attributes.

11. An apparatus as recited in claim 8, further comprising:
   means for determining that a second route needs to be advertised to the BGP peer node that processes only two-octet AS identifier values;
   means for creating a second route message, wherein each four-octet AS path value of an AS path is stored in a second extended community attribute that is attached to the second route message;
   means for formatting an AS path attribute of the second route message to contain two-octet AS path values;
   means for inserting one or more two-octet AS values into the AS path attribute, wherein each of the inserted two-octet AS path values identifies the first node, wherein a number of inserted two-octet AS path values is equal to a number of the four-octet AS path values that were stored in the extended community attribute;
   means for sending the second route message to the BGP peer node.

12. An apparatus as recited in claim 11, wherein the second extended community attribute is a transitive extended community attribute.

13. An apparatus as recited in claim 8, wherein the first node advertises a capability of processing four-octet AS path values to the BGP peer node.

14. A packet routing apparatus for processing both two-octet and four-octet autonomous system (AS) identifier values in a first network node that communicates with peer network nodes using Border Gateway Protocol (BGP), comprising:
   a network interface that is coupled to the data network for receiving one or more packet flows therefrom;
   a processor;
   one or more stored sequences of instructions which, when executed by the processor, cause the processor to carry out the steps of:
      receiving a first route message from a BGP peer node that is outside a local autonomous system that includes the first network node, wherein the BGP peer node processes only two-octet AS identifier values;
      identifying one or more extended community attributes in a first route in the first route message;
      modifying the first route by creating an AS set containing four-octet AS identifier values carried in each of the identified extended community attributes, and attaching the AS set to the first route;
      sending the modified first route to a third BGP node.

15. An apparatus as recited in claim 14, wherein the AS set is attached to an AS path attribute of the first route.

16. An apparatus as recited in claim 14, wherein the extended community attributes are BGP transitive extended community attributes.

17. An apparatus as recited in claim 14, further comprising instructions for performing:
   determining that a second route needs to be advertised to the BGP peer node that processes only two-octet AS identifier values;
   creating a second route message, wherein each four-octet AS path value of an AS path is stored in a second extended community attribute that is attached to the second route message;
   formatting an AS path attribute of the second route message to contain two-octet AS path values;
   inserting one or more two-octet AS values into the AS path attribute, wherein each of the inserted two-octet AS path values identifies the first node, wherein a number of inserted two-octet AS path values is equal to a number of the four-octet AS path values that were stored in the extended community attribute;
   sending the second route message to the BGP peer node.

18. An apparatus as recited in claim 17, wherein the second extended community attribute is a transitive extended community attribute.

19. An apparatus as recited in claim 14, wherein the first node advertises a capability of processing four-octet AS path values to the BGP peer node.

20. A computer-readable volatile or non-volatile medium carrying one or more sequences of instructions for processing both two-octet and four-octet autonomous system (AS) identifier values in a first network node that communicates with peer network nodes using Border Gateway Protocol (BGP), which instructions, when executed by one or more processors, cause the one or more processors to carry out the steps of:
   receiving a first route message from a BGP peer node that is outside a local autonomous system that includes the first network node, wherein the BGP peer node processes only two-octet AS identifier values;

identifying one or more extended community attributes in a first route in the first route message;

for each of the identified extended community attributes, modifying the first route by creating an AS set containing four-octet AS identifier values carried in the identified extended community attributes, and attaching the AS set to the first route;

sending the modified first route to a third BGP node.

21. A computer-readable volatile or non-volatile medium as recited in claim 20, wherein the AS set is attached to an AS path attribute of the first route.

22. A computer-readable volatile or non-volatile medium as recited in claim 20, wherein the extended community attributes are BGP transitive extended community attributes.

23. A computer-readable volatile or non-volatile medium as recited in claim 20, further comprising instructions for performing the steps of:

determining that a second route needs to be advertised to the BGP peer node that processes only two-octet AS identifier values;

creating a second route message, wherein each four-octet AS path value of an AS path is stored in a second extended community attribute that is attached to the second route message;

formatting an AS path attribute of the second route message to contain two-octet AS path values;

inserting one or more two-octet AS values into the AS path attribute, wherein each of the inserted two-octet AS path values identifies the first node, wherein a number of inserted two-octet AS path values is equal to a number of the four-octet AS path values that were stored in the extended community attribute;

sending the second route message to the BGP peer node.

24. A computer-readable volatile or non-volatile medium as recited in claim 23, wherein the second extended community attribute is a transitive extended community attribute.

25. A computer-readable volatile or non-volatile medium as recited in claim 20, wherein the first node advertises a capability of processing four-octet AS path values to the BGP peer node.

26. A computer-readable volatile or non-volatile medium as recited in claim 20, further comprising instructions for discarding the first route upon detecting a loop.

* * * * *